(12) United States Patent
Mitsui et al.

(10) Patent No.: US 11,980,335 B2
(45) Date of Patent: May 14, 2024

(54) RECHARGEABLE CLEANER

(71) Applicant: MAKITA CORPORATION, Anjo (JP)

(72) Inventors: Ryuji Mitsui, Anjo (JP); Tadahiko Kobayakawa, Anjo (JP); Takuya Umemura, Anjo (JP); Toru Yamada, Anjo (JP); Mamoru Sakai, Anjo (JP)

(73) Assignee: MAKITA CORPORATION, Anjo (JP)

( * ) Notice: Subject to any disclaimer, the term of this patent is extended or adjusted under 35 U.S.C. 154(b) by 669 days.

(21) Appl. No.: 17/253,470

(22) PCT Filed: May 23, 2019

(86) PCT No.: PCT/JP2019/020519
§ 371 (c)(1),
(2) Date: Dec. 17, 2020

(87) PCT Pub. No.: WO2020/003827
PCT Pub. Date: Jan. 2, 2020

(65) Prior Publication Data
US 2021/0274990 A1 Sep. 9, 2021

(30) Foreign Application Priority Data
Jun. 26, 2018 (JP) .................. 2018-121288

(51) Int. Cl.
*H02J 7/00* (2006.01)
*A47L 5/22* (2006.01)
(Continued)

(52) U.S. Cl.
CPC ............. *A47L 9/2873* (2013.01); *A47L 5/225* (2013.01); *A47L 5/24* (2013.01); *A47L 9/2805* (2013.01);
(Continued)

(58) Field of Classification Search
USPC ........................................................ 320/107
See application file for complete search history.

(56) References Cited

U.S. PATENT DOCUMENTS

2003/0201754 A1* 10/2003 Conrad .................. A47L 9/2873
320/116
2005/0017681 A1* 1/2005 Ogishima ............. A47L 9/2805
320/112
(Continued)

FOREIGN PATENT DOCUMENTS

CN 104682485 A 6/2015
CN 105832247 A 8/2016
(Continued)

OTHER PUBLICATIONS

Machine Translation of JP201151874 (Year: 2011).*
(Continued)

*Primary Examiner* — Samuel Berhanu
(74) *Attorney, Agent, or Firm* — Oliff PLC

(57) ABSTRACT

A rechargeable cleaner includes a body, a rechargeable battery, and a charger. The body is configured to generate suction power capable of sucking dust together with air using a motor. The rechargeable battery is configured to supply electric power to the motor. The charger is configured to charge the battery at a charging rate of 3 C or higher and lower than 10 C.

12 Claims, 11 Drawing Sheets

(51) Int. Cl.
*A47L 5/24* (2006.01)
*A47L 9/28* (2006.01)
*H01M 10/44* (2006.01)
*H01M 10/46* (2006.01)
*H01M 10/48* (2006.01)
*H02J 7/04* (2006.01)

(52) U.S. Cl.
CPC ........... *A47L 9/2836* (2013.01); *A47L 9/2884* (2013.01); *H01M 10/44* (2013.01); *H01M 10/46* (2013.01); *H01M 10/48* (2013.01); *H02J 7/0047* (2013.01); *H02J 7/04* (2013.01); *H01M 2220/30* (2013.01); *H02J 7/0042* (2013.01)

(56) References Cited

U.S. PATENT DOCUMENTS

| | | | |
|---|---|---|---|
| 2006/0087285 A1 | 4/2006 | Phillips et al. | |
| 2006/0087286 A1* | 4/2006 | Phillips | H01M 10/441 320/114 |
| 2014/0056738 A1* | 2/2014 | Takahashi | A47L 9/2831 417/411 |
| 2015/0153416 A1 | 6/2015 | Umemura et al. | |
| 2016/0088992 A1* | 3/2016 | Lee | A47L 9/2884 15/319 |
| 2016/0213218 A1 | 7/2016 | Ham et al. | |

FOREIGN PATENT DOCUMENTS

| | | |
|---|---|---|
| JP | 2004-064861 A | 2/2004 |
| JP | 2004-158262 A | 6/2004 |
| JP | 2008-278996 A | 11/2008 |
| JP | 2013-143789 A | 7/2013 |
| JP | 2014-045538 A | 3/2014 |
| JP | 2016-092948 A | 5/2016 |

OTHER PUBLICATIONS

Machine Translation of JP 20040158262A (Year: 2004).*
Jan. 4, 2022 Office Action issued in Japanese Patent Application No. 2018-121288.
Jul. 30, 2019 International Search Report issued in International Patent Application No. PCT/JP2019/020519.
Jul. 30, 2019 Written Opinion of the International Searching Authority issued in International Patent Application No. PCT/JP2019/020519.
Jan. 4, 2024 Office Action issued in Chinese Application No. 201980038859.2.

* cited by examiner

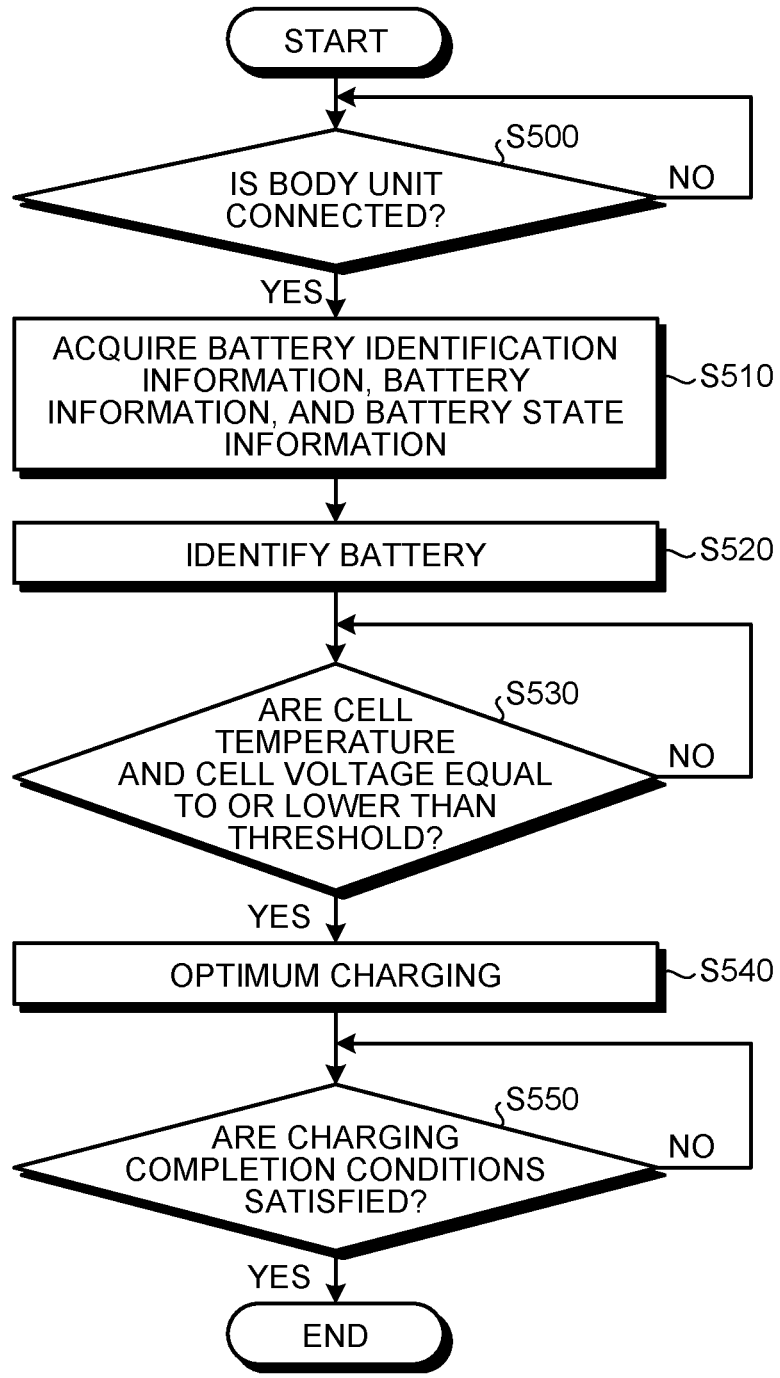

RECHARGEABLE CLEANER

FIELD

The present invention relates to a rechargeable cleaner.

BACKGROUND

Conventional rechargeable cleaners require several hours to charge a battery from a completely discharged state to a fully charged state. Widely known are techniques relating to a rechargeable cleaner that can be fully charged in a short time (refer to Patent Literature 1, for example). Patent Literature 1 uses a lithium-ion secondary battery that can be rapidly charged with an electric current at a rate of 10 C or more as a battery.

CITATION LIST

Patent Literature

Patent Literature 1: JP 2008-278996 A

SUMMARY

Technical Problem

When charging a battery at a charging rate of 10 C or higher, the current value of the charging current becomes ten times or larger the current value of the charging current at a current rate of 1 C. When the current value of the charging current becomes large, it is necessary to make an electric wire used as a charging path thicker than an ordinary electric wire, so that the rechargeable cleaner and a charger may possibly be increased in size and heavy in weight. In addition, when the current value of the charging current is large, the electronic parts may generate heat and have a high temperature at a time of rapid charging, thereby affecting the lives of various members. Alternatively, to efficiently radiate the heat generated, a larger radiator is required, so that the rechargeable cleaner and the charger may possibly be increased in size and weight. To address this, there is a demand for a rapidly rechargeable cleaner that is small in size and light in weight and that has a smaller effect on the lives of various members.

An object of an aspect of the present invention is to provide a rapidly rechargeable cleaner that is small in size and light in weight and that has a smaller effect on the lives of various members.

Solution to Problem

According to an aspect of the present invention, a rechargeable cleaner includes: a body configured to generate suction power capable of sucking dust together with air using a motor; a rechargeable battery configured to supply electric power to the motor; and a charger configured to charge the battery at a charging rate of 3 C or higher and lower than 10 C.

Advantageous Effects of Invention

An aspect of the present invention provides a rapidly rechargeable cleaner that is small in size and light in weight and that has a smaller effect on the lives of various members.

BRIEF DESCRIPTION OF DRAWINGS

FIG. 12 is a flowchart of an example of the method for charging the rechargeable cleaner according to the second embodiment and illustrates processing performed by the charger control circuit.

DESCRIPTION OF EMBODIMENTS

Embodiments according to the present invention will be described below in detail with reference to the accompanying drawings. The embodiments are not intended to limit the present invention. Components in the embodiments below include components replaceable and easy to replace by those skilled in the art and components substantially identical therewith. Furthermore, the components described below may be appropriately combined. If there are a plurality of embodiments, they may be combined.

In the following description, an X-axis direction is referred to as a "front-back direction". A Y-axis direction is referred to as a "left-right direction". The Y-axis direction is horizontally orthogonal to the X-axis direction. In the direction toward the "front" in the front-back direction, the left side is "left", and the right side is "right". A Z-axis direction is referred to as an "up-down direction". The Z-axis direction is orthogonal to the X-axis direction and the Y-axis direction.

First Embodiment

Figure 1:
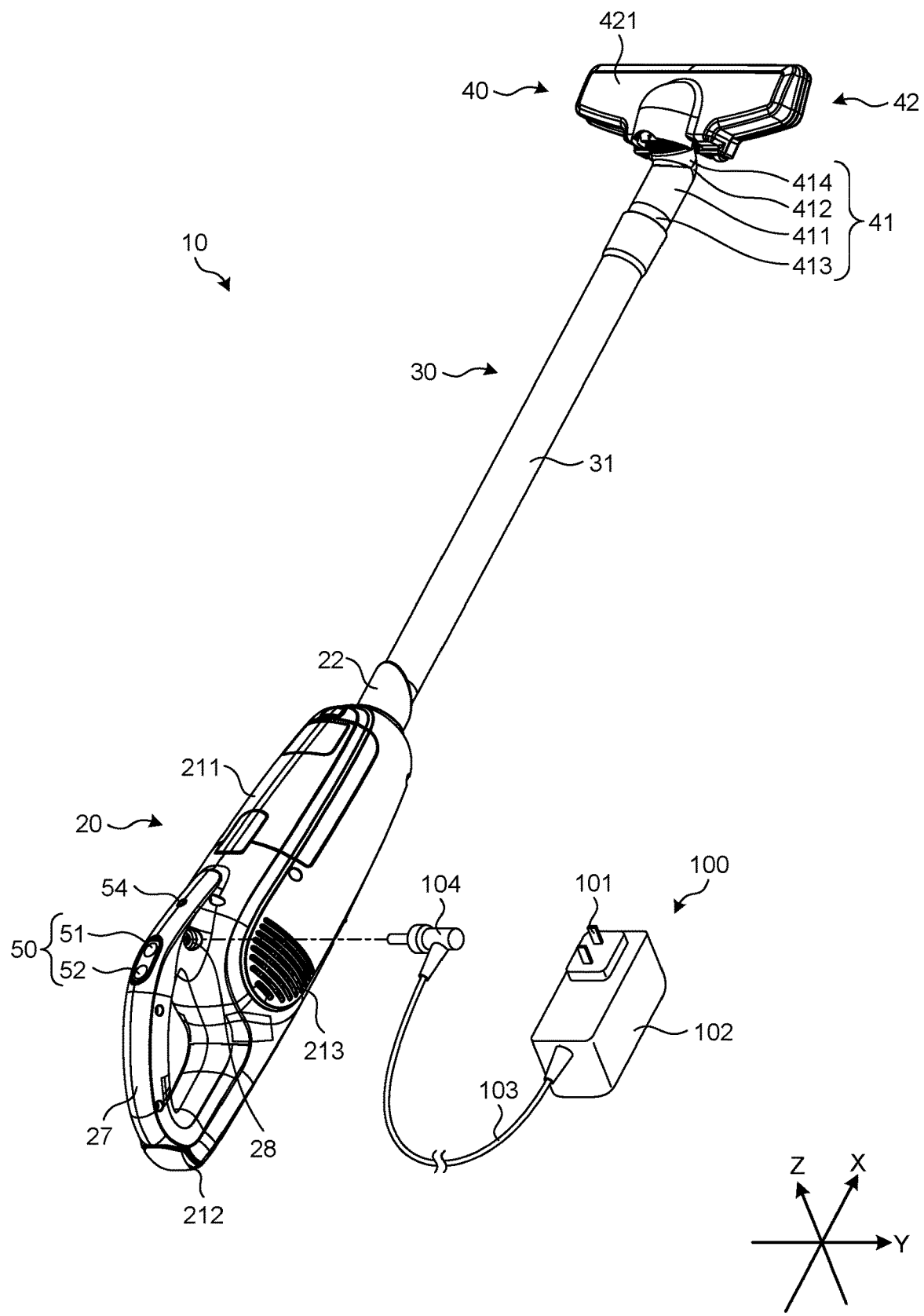
FIG. 1 is a perspective view of an example of a rechargeable cleaner according to a first embodiment.
Figure 2:
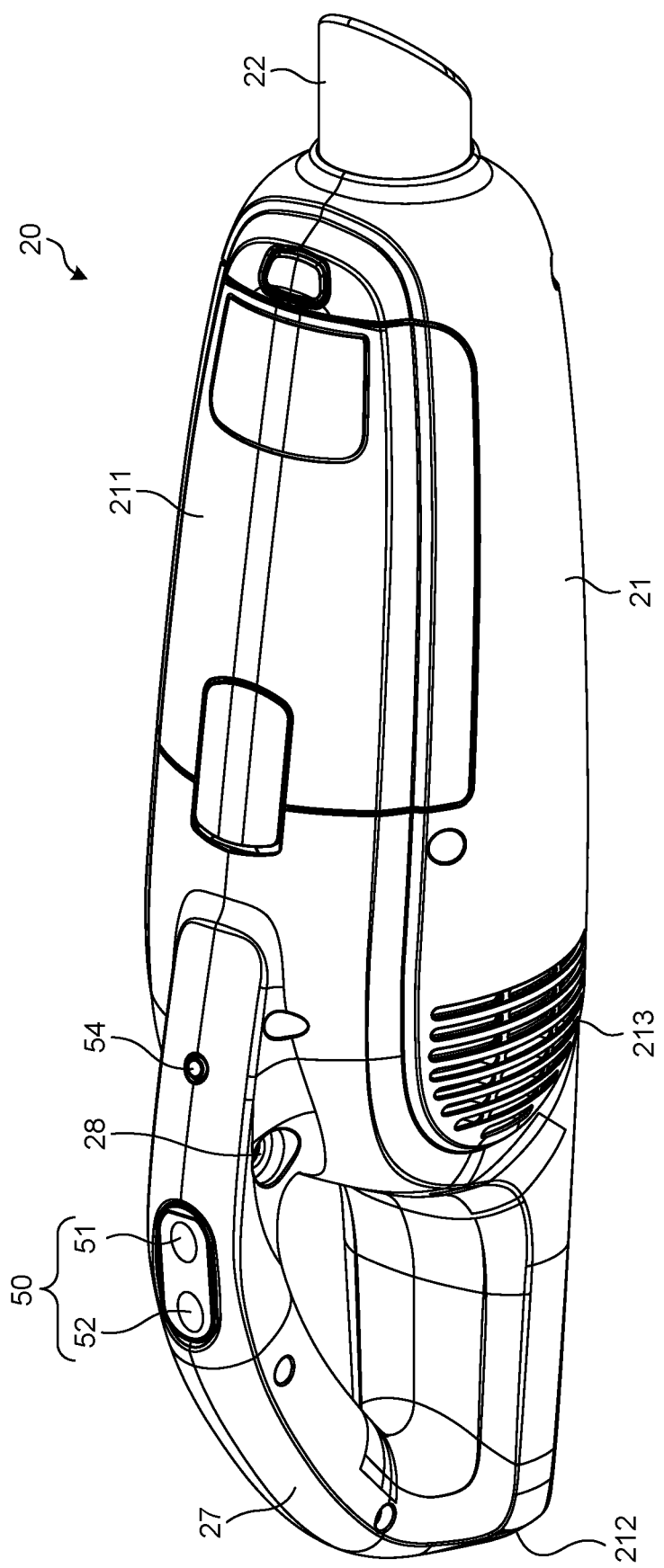
FIG. 2 is a perspective view of an example of a body of the rechargeable cleaner according to the first embodiment.
Figure 3:
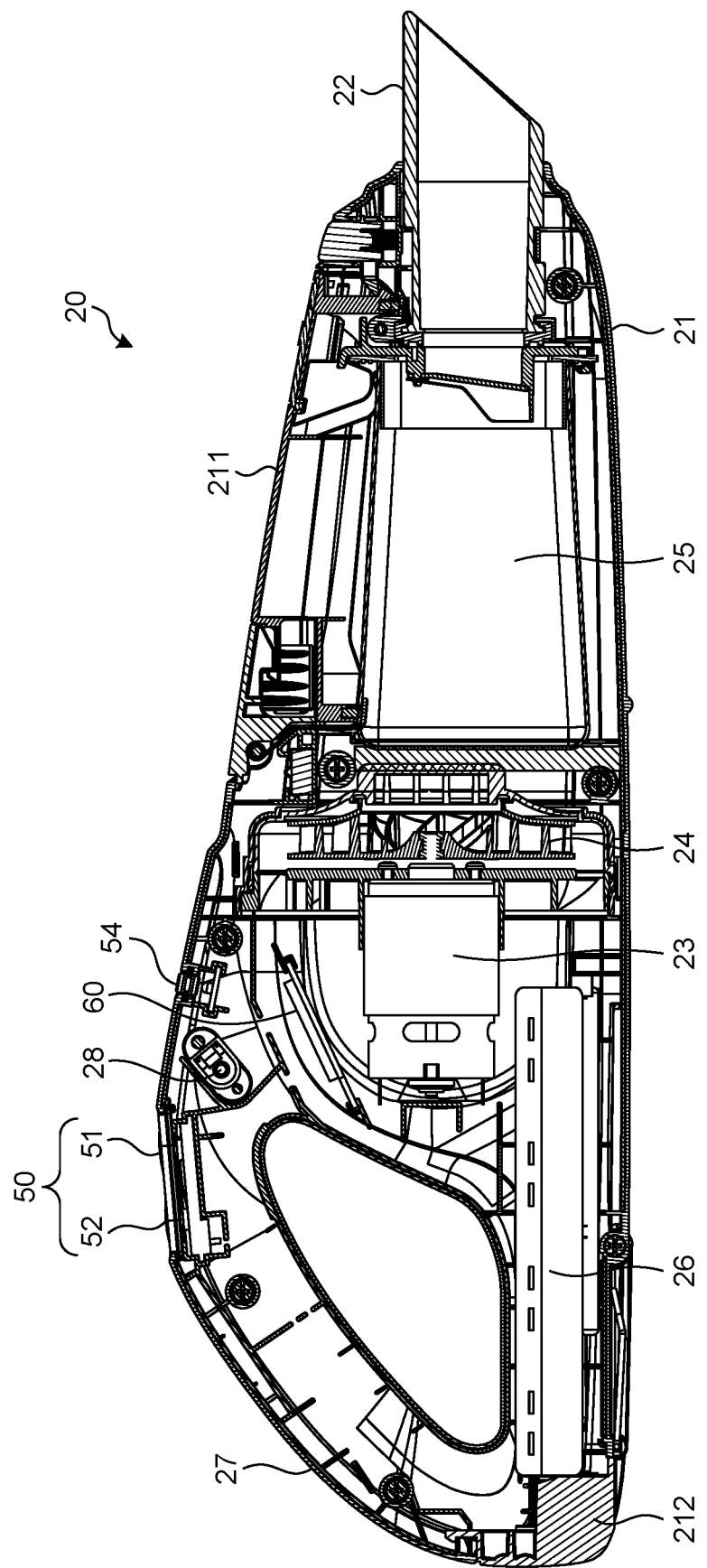
FIG. 3 is a sectional view of an example of the body of the rechargeable cleaner according to the first embodiment.
Figure 4:
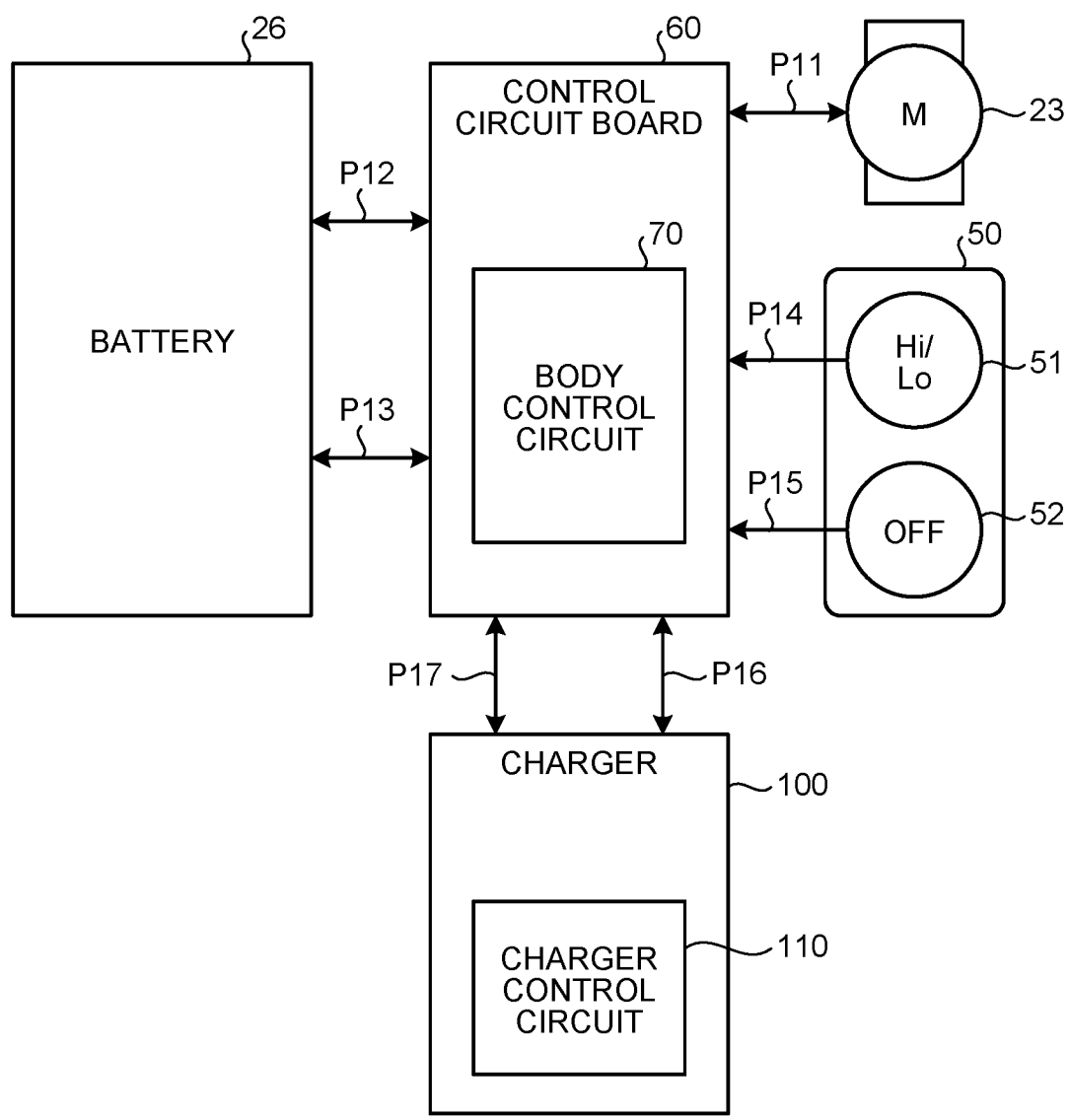
FIG. 4 is a block diagram of an example of a control circuit of the rechargeable cleaner according to the first embodiment.

An outline of a rechargeable cleaner 10 will be described with reference to FIGS. 1 to 4. FIG. 1 is a perspective view of an example of the rechargeable cleaner according to a first embodiment. FIG. 2 is a perspective view of an example of a body of the rechargeable cleaner according to the first embodiment. FIG. 3 is a sectional view of an example of the body of the rechargeable cleaner according to the first embodiment. FIG. 4 is a block diagram of an example of a control circuit of the rechargeable cleaner according to the first embodiment. The rechargeable cleaner 10 operates by being supplied with electric power from a rechargeable battery pack (hereinafter, referred to as a "battery") 26.

The rechargeable cleaner 10 includes a body unit (body) 20, a pipe unit 30, a nozzle unit 40, a control circuit board 60, and a charger 100.

The body unit 20 generates suction power capable of sucking dust together with air. The body unit 20 includes a case 21, a suction port 22, a motor 23, a suction fan 24, a dust collection filter 25, a battery 26, a handle 27, and a direct current (DC) jack 28.

The case 21 defines the outer shape of the body unit 20. The case 21 houses the motor 23, the suction fan 24, the dust collection filter 25, and the battery 26. The case 21 has a cylindrical shape. The case 21 includes an opening/closing cover 211, a lid 212, and an exhaust port 213.

The opening/closing cover 211 forms a part of the outer periphery of the case 21. The opening/closing cover 211 is disposed at the upper front part of the outer periphery of the case 21. The opening/closing cover 211 opens and closes with respect to the case 21. With the opening/closing cover 211 opened, the dust collection filter 25 can be taken in and out.

The lid 212 forms a part of the outer periphery of the case 21. The lid 212 opens and closes with respect to the case 21. With the lid 212 opened, the battery 26 can be taken in and out.

The exhaust port 213 communicates between the inside and the outside of the case 21. The exhaust port 213 discharges air sucked from the suction port 22 to the outside of the case 21.

The suction port 22 is a port through which dust is sucked into the dust collection filter 25 together with air. The suction port 22 communicates between the inside and the outside of the case 21. The suction port 22 is disposed at the front end of the case 21. To the suction port 22, the pipe unit 30 can be coupled. Through the suction port 22, external air is sucked into a housing 2 via the pipe unit 30 when the suction fan 24 rotates.

The motor 23 rotates, thereby rotating the suction fan 24 for generating suction power capable of sucking dust together with air. The motor 23 rotates by electric power supplied from the battery 26 via a discharging path P11 serving as an electric wire. The motor 23 is coupled to the suction fan 24 with an output shaft. In the case 21, the motor 23 is disposed behind the suction port 22, the suction fan 24, and the dust collection filter 25. The rotation speed of the motor 23 may be adjustable. The rotation speed of the motor 23 according to the present embodiment can be adjusted in three stages. The rotation speed of the motor 23 is controlled by a discharging current supplied from a body control circuit (body controller) 70 of the control circuit board 60.

The suction fan 24 generates suction power capable of sucking dust together with air when the motor 23 rotates. The suction fan 24 generates an air flow capable of sucking dust together with air. In the case 21, the suction fan 24 is disposed in front of the motor 23 and behind the dust collection filter 25. The suction fan 24 is coupled to a rotating shaft of the motor 23. The suction fan 24 rotates when the motor 23 rotates. When the suction fan 24 rotates, air is sucked into the case 21 from the suction port 22. The air flow volume of the suction fan 24 can be adjusted corresponding to the rotation speed of the motor 23. The airflow volume of the suction fan 24 according to the present embodiment can be adjusted in three stages. The airflow volume of the suction fan 24 varies depending on the operating mode of the rechargeable cleaner 10.

The dust collection filter 25 removes dust included in the sucked air. The dust collection filter 25 has a cylindrical shape with one end open and the other end closed. The dust collection filter 25 is housed in the case 21. More specifically, in the case 21, the dust collection filter 25 is disposed behind the suction port 22. In the case 21, the dust collection filter 25 is disposed in front of the suction fan 24. The opening of the dust collection filter 25 faces the suction port 22. The dust collection filter 25 causes air sucked from the suction port 22 to pass therethrough and collects dust included in the air inside thereof. The air passing through the dust collection filter 25 is discharged from the exhaust port 213. The dust collection filter 25 can be attached and detached with the opening/closing cover 211 opened.

The battery 26 is a rechargeable battery. The battery 26 is capable of being rapidly charged. The battery 26 supplies electric power to the motor 23 of the rechargeable cleaner 10. The battery 26 is composed of a plurality of cells connected to each other. The capacity of the battery 26 according to the present embodiment is approximately 1 Ah or larger and 2 Ah or smaller. The battery 26 is attachable to and detachable from the inside of the case 21 with the lid 212 opened. The battery 26 is electrically connected to the body control circuit 70 of the control circuit board 60 via a signal path P12 serving as a signal line and a charging/recharging path P13 serving as an electric wire.

The battery 26 can detect at least one of a cell temperature and a cell voltage of the battery 26. The battery 26 according to the present embodiment detects the cell temperature and the cell voltage of the battery 26. The cell voltage of the battery 26 can be detected by a monitoring circuit, which is not illustrated. The cell temperature of the battery 26 can be detected by a temperature detecting circuit, which is not illustrated. The battery 26 outputs battery identification information for identifying the type of the battery 26 and battery information including at least one of the cell temperature and the cell voltage of the battery 26 as analog signals to the body control circuit 70 via the signal path P12. When the battery 26 is connected to the body unit 20, the battery 26 outputs the battery identification information and the battery information to the body control circuit 70. After charging is started, the battery 26 outputs the battery information to the body control circuit 70 at a predetermined timing.

The predetermined timing may be a timing of every certain time interval or a timing at which the cell voltage or the cell temperature changes by a predetermined threshold or larger.

Discharging of the battery 26 via the charging/discharging path P13 is controlled by the body control circuit 70. In discharging of the battery 26, the discharging current flows through the charging/discharging path P13 and the discharging path P11.

Charging of the battery 26 via a charging path P17 serving as an electric wire and the charging/discharging path P13 is controlled by a charger control circuit (charger controller) 110 of the charger 100. In charging of the battery 26, the charging current flows through the charging path P17 and the charging/discharging path P13.

The handle 27 is a grip that is gripped by a user.

The DC jack 28 can be electrically connected to a DC plug 104 of the charger 100. The DC jack 28 can be electrically connected to the battery 26 via the control circuit board 60. With this configuration, the DC jack 28 supplies a direct current for charging supplied from the charger 100 to the battery 26 via the control circuit board 60.

The pipe unit 30 allows air and dust sucked from the nozzle unit 40 to pass therethrough. The pipe unit 30 is attachable to and detachable from the suction port 22 and the nozzle unit 40. The pipe unit 30 connects the suction port 22 and the nozzle unit 40. The pipe unit 30 includes a pipe member 31. The pipe member 31 has a cylindrical shape. The front end of the pipe member 31 can be coupled to the nozzle unit 40. The back end of the pipe member 31 can be coupled to the suction port 22.

The nozzle unit 40 sucks air and dust. The nozzle unit 40 is attachable to and detachable from the front end of the pipe member 31 of the pipe unit 30. The nozzle unit 40 includes a coupler 41 and a head 42.

The coupler 41 can be coupled to the front end of the pipe member 31 of the pipe unit 30. The coupler 41 has a pipe shape. The coupler 41 has a bent shape in side view. The head 42 is rotatably coupled to the distal end of the coupler 41.

The head 42 is a suction port through which air and dust are sucked. The head 42 includes a housing 421 and a suction port, which is not illustrated. The head 42 is coupled to the coupler 41 so as to be relatively rotatable in the circumferential direction of the pipe. The housing 421 has a box shape extending in the left-right direction. The housing 421 can house various members. The suction port is an opening formed on the bottom surface of the housing 421. The suction port communicates with the coupler 41.

An operating switch 50 is disposed on the handle 27. The operating switch 50 is an electronic switch that can receive various operations performed on the rechargeable cleaner 10. The operating switch 50 can be operated when the user grips the handle 27. The operating switch 50 includes a drive switch (mode setting operator) 51 and a stop switch 52.

The drive switch 51 is pressed and operated by the user to switch the operating mode indicating the strength of suction power of the rechargeable cleaner 10. In the present embodiment, every time the drive switch 51 is pressed, the operating mode can be switched between high (high mode), normal (low mode), and turbo (high-power mode). The high mode is a mode for rotating the motor 23 at high speed. The low mode is a mode for rotating the motor 23 at lower speed than the high mode. The high-power mode is a mode for rotating the motor 23 at higher speed than the high mode. Every time the drive switch 51 is pressed, the drive switch 51 outputs electrical signals corresponding to the operating information to the body control circuit 70 via a signal path P14 serving as a signal line.

The stop switch 52 is pressed and operated by the user to stop the operation of the rechargeable cleaner 10. When the stop switch 52 is pressed when the rechargeable cleaner 10 is operating, the stop switch 52 can stop the operation. When the stop switch 52 is pressed, the stop switch 52 outputs electrical signals corresponding to the operating information to the body control circuit 70 via a signal path P15 serving as a signal line.

An LED 54 is disposed in front of the operating switch 50. The LED 54 is turned on to indicate a charging state when the rechargeable cleaner 10 is being charged. The LED 54, for example, is turned on in red in rapid charging, turned on in orange in slow charging, and turned off when the rechargeable cleaner 10 is not being charged or is fully charged. The lighting state of the LED 54 is controlled by the body control circuit 70.

The control circuit board 60 is disposed in the case 21. The control circuit board 60 has a function of receiving electric power supplied from the charger 100 and charging the battery 26 and a function of receiving electric power supplied from the battery 26 and discharging it to the motor 23. In other words, the control circuit board 60 has a discharging path and a charging path. The discharging path is a path for flowing an electric current from the positive side of the battery 26 to the negative side of the battery 26 via the motor 23, that is, a path for discharging the battery 26. The charging path is a path that connects the positive terminal of the charger 100 to the positive side of the battery 26 and connects the negative terminal of the charger 100 to the negative side of the battery 26, that is, a path for charging the battery 26. The control circuit board 60 is provided with electronic parts that implement these functions. The control circuit board 60 includes the body control circuit 70.

The body control circuit 70 includes a central processing unit (CPU) that performs arithmetic processing and a memory that stores therein computer programs. The body control circuit 70 executes the rotation of the motor 23 and the charging and discharging of the battery 26 according to a control program stored in the memory.

The body control circuit 70 is electrically connected to the motor 23 via the discharging path P11. The body control circuit 70 is electrically connected to the battery 26 via the signal path P12 and the charging/discharging path P13. The body control circuit 70 is electrically connected to the drive switch 51 via the signal path P14. The body control circuit 70 is electrically connected to the stop switch 52 via the signal path P15. The body control circuit 70 is electrically connected to the charger 100 via a signal path P16 serving as a signal line and the charging path P17.

When the body control circuit 70 detects that the battery 26 is connected to the body unit 20, the body control circuit 70 acquires the battery identification information and the battery information from the battery 26 via the signal path P12. At a predetermined timing after charging is started, the body control circuit 70 acquires the battery information from the battery 26 via the signal path P12.

When the body control circuit 70 detects that the charger 100 is connected to the body unit 20, the body control circuit 70 outputs the battery identification information and the battery information as digital signals to the charger 100 via the signal path P16. After charging is started, the body control circuit 70 outputs the battery information as digital signals to the charger 100 via the signal path P16 at a predetermined timing.

The body control circuit 70 detects an output voltage between the terminal connected to the positive side of the battery 26 and the terminal connected to the negative side. The detected output voltage is the voltage of the battery 26, that is, the output voltage from the battery 26. The detected output voltage is included in the battery information and output to the charger 100.

If the drive switch 51 is operated when the motor 23 is being stopped, the body control circuit 70 sets the operating mode to the high mode, for example, as an initial operating mode. The body control circuit 70 supplies the discharging current from the battery 26 to the motor 23 via the charging/discharging path P13 and the discharging path P11. After the initial operating mode is set, the body control circuit 70 switches the operating mode depending on whether the drive switch 51 is operated or on operating duration, that is, duration of the ON state until the stop switch 52 is operated. With this, the body control circuit 70 switches the discharging current from the battery 26.

Every time the drive switch 51 is operated when the motor 23 is operating, the body control circuit 70 controls the rotation speed of the motor 23 depending on the operating mode. When the drive switch 51 is operated to select the high mode, the body control circuit 70 performs control such that the rotation speed of the motor 23 is a high speed corresponding to the high mode. The body control circuit 70 increases the discharging current from the battery 26. When the drive switch 51 is operated to select the low mode, the body control circuit 70 performs control such that the rotation speed of the motor 23 is a normal speed corresponding to the low mode. The body control circuit 70 decreases the discharging current from the battery 26. When the drive switch 51 is operated to select the high-power mode, the body control circuit 70 performs control such that the rotation speed of the motor 23 is a high speed corresponding to the high-power mode. The body control circuit 70 makes the discharging current from the battery 26 larger than the discharging current in the high mode. With these operations, the amount of suction power of the rechargeable cleaner 10 is controlled in accordance with the operating modes.

The memory of the body control circuit 70 stores therein current values of the discharging current set for the respective operating modes as control data for rotating the motor 23 in the operating modes.

If the stop switch 52 is operated when the motor 23 is rotating, the body control circuit 70 stops supply of the discharging current to stop the rotation of the motor 23.

The charger 100 controls charging the battery 26. The charger 100 generates and outputs a direct current for charging the battery 26 from an alternating current supplied from an AC power source. The charger 100 can output a high-rate charging current corresponding to rapid charging. In rapid charging, the charger 100 can charge the battery 26 at a charging rate of 3 C or higher and lower than 10 C, for example. The charger 100 can output a charging current of approximately 3 A to 10 A when the capacity of the battery 26 is 1 Ah, for example, and output a charging current of approximately 6 A to 20 A when the capacity of the battery 26 is 2 Ah.

By setting the charging rate to 3 C or higher, the battery 26 is fully charged in 20 minutes or shorter. Approximately 20 minutes corresponds to the length of a typical break time. Consequently, the battery 26 is charged while a user is having a break.

By setting the charging rate to lower than 10 C, power consumption is 0.1 W or larger and 0.4 W or smaller when the capacity of the battery 26 is 1 Ah or larger and 2 Ah or smaller, and on-resistance of an FET, which is not illustrated, disposed in the circuit is 1 mΩ. The rechargeable cleaner 10 does not require any radiator plate because this degree of power consumption generates a small amount of heat.

The charger 100 includes an attachment plug 101, an adapter case 102, an electric wire 103, a DC plug 104, and a charger control circuit 110. The attachment plug 101 can be inserted into an outlet of the AC power source. The adapter case 102 houses various electronic parts for generating a direct current. The various electronic parts housed in the adapter case 102 electrically connect the attachment plug 101 and the electric wire 103. The electric wire 103 electrically connects the attachment plug 101 and the DC plug 104. The DC plug 104 is disposed at the end of the electric wire 103. The DC plug 104 can be electrically connected to the DC jack 28 of the body unit 20. The DC plug 104 is inserted into the DC jack 28 of the body unit 20, thereby supplying the direct current generated in the charger 100 to the battery 26 via the control circuit board 60.

The charger control circuit 110 includes a CPU that performs arithmetic processing and a memory that stores therein computer programs.

The charger control circuit 110 acquires the battery identification information and the battery information via the body control circuit 70. More specifically, when charging is started, the charger control circuit 110 acquires the battery identification information and the battery information on the battery 26 output from the body control circuit 70 via the signal path P16. After charging is started, the charger control circuit 110 acquires the battery information output from the body control circuit 70 via the signal path P16 at a predetermined timing.

The charger control circuit 110 can detect the temperature of the charger 100 and an input voltage received from the AC power source. When the temperature of the charger 100 is equal to or higher than a threshold, or when the input voltage is low, the charger control circuit 110 restricts charging the battery 26.

The memory of the charger control circuit 110 stores therein, for each battery type, rated capacity, a range of allowable voltage in charging, a range of allowable temperature in charging, and a high-rate charging current for rapid charging, that is, the maximum allowable current as charging information. The memory of the charger control circuit 110 also stores therein charging current characteristics and charging voltage characteristics as the charging information for each battery type.

Figure 5:
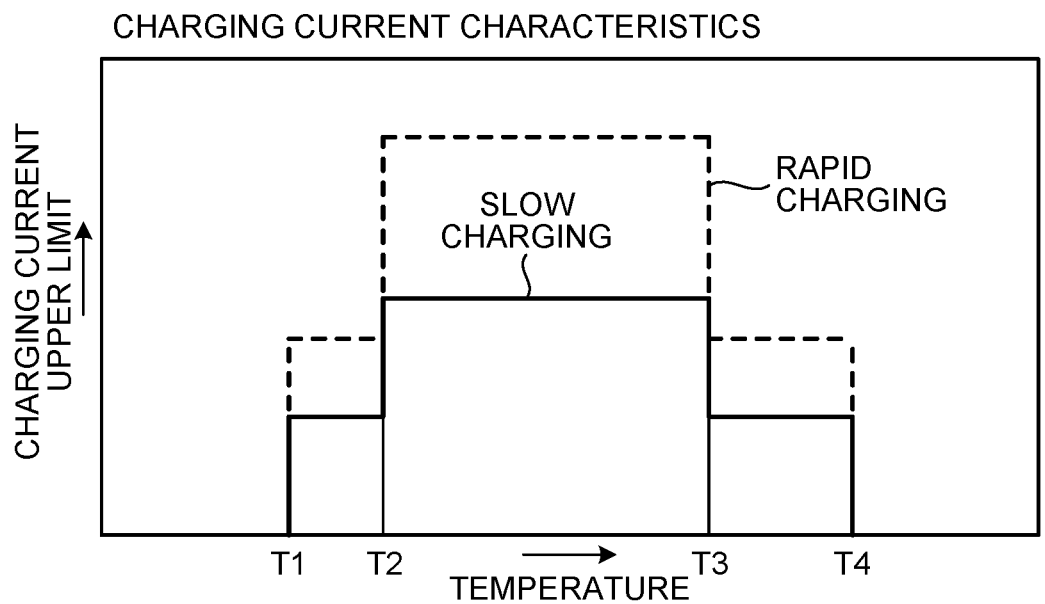
FIG. 5 is a diagram for explaining charging current characteristics.
Figure 6:
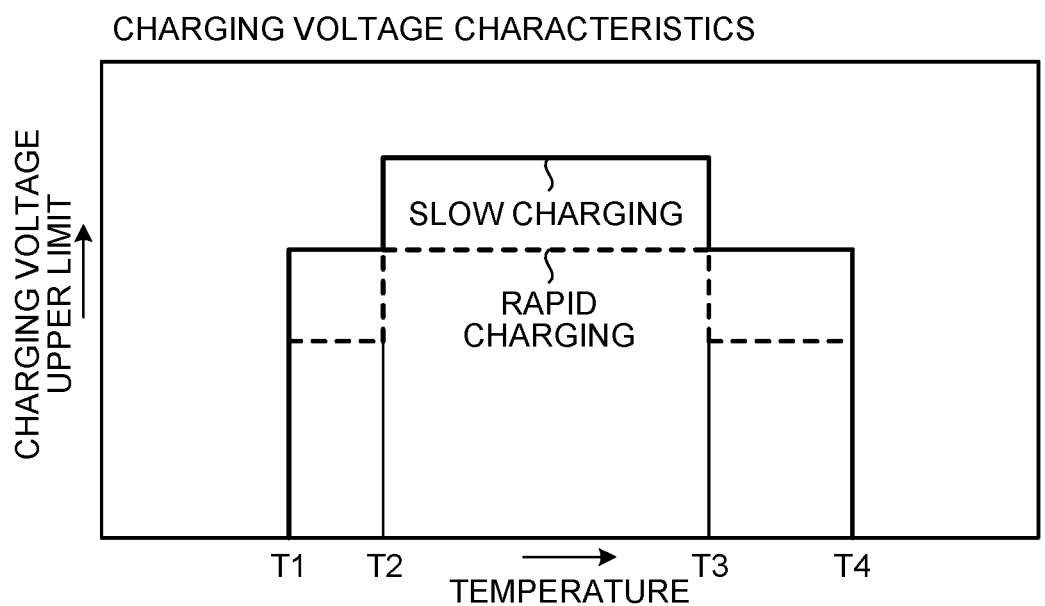
FIG. 6 is a diagram for explaining charging voltage characteristics.

The following describes the charging current characteristics and the charging voltage characteristics with reference to FIGS. 5 and 6. FIG. 5 is a diagram for explaining the charging current characteristics. FIG. 6 is a diagram for explaining the charging voltage characteristics. The charging current characteristics define the upper limit of the charging current corresponding to the cell temperature. The charging current characteristics define the characteristics of the high-rate charging current for rapid charging and the characteristics of the low-rate charging current for slow charging. The charging voltage characteristics define the upper limit of the charging voltage corresponding to the cell temperature. The charging voltage characteristics define the characteristics of the charging voltage for rapid charging and the characteristics of the charging voltage for slow charging.

The charger control circuit 110 controls charging of the battery 26. After rapidly charging the battery 26, the charger control circuit 110 slowly charges the battery 26. The charger control circuit 110 generates and outputs a direct current by adjusting at least one of the AC current and voltage supplied from the AC power source to the charging current and the charging voltage required to charge the battery 26 based on the battery identification information and the battery information.

Rapid charging is charging with the charging current at a high rate of 3 C or higher and lower than 10 C. "C" is the unit indicating the charging/discharging rate (charge/discharge rate). 1 C indicates that charging can be achieved in one hour when constant-current charging is performed from a completely discharged state to a fully charged state. 3 C indicates that charging can be achieved in one-third hour, and 10 C indicates that charging can be achieved in one-tenth hour. At a charging/discharging rate of 3 C, the current value of the charging current is three times the current value at 1 C. At a charging/discharging rate of 10 C, the current value of the charging current is ten times the current value at 1 C.

Slow charging is charging with the charging current at a lower rate than in rapid charging. Slow charging is charging with the charging current having a current value equal to or smaller than the current value of the charging current in rapid charging. When rapid charging is performed with a constant current of 10 A, for example, slow charging is performed at a current value of smaller than 10 A and a constant voltage.

The following describes charging control performed by the charger control circuit 110 in more detail. When drive of the motor 23 is stopped, if the charger 100 is connected to the body unit 20, and the state of the battery 26 satisfies charging start conditions, the charger control circuit 110 starts rapid charging of the battery 26. The charger control circuit 110 acquires the current value of the high-rate charging current for rapid charging based on the charging information and the battery identification information. The charger control circuit 110 generates the high-rate charging current having the acquired current value and charges the battery 26.

The charging start conditions include that the cell temperature of the battery 26 is equal to or lower than a threshold for determining whether to start charging and that the cell voltage is equal to or lower than a threshold for determining whether to start charging. The charging start conditions are stored in the memory of the body control circuit 70 as the control data.

The charging start conditions may further include that the remaining charge of the battery 26 is smaller than a threshold for determining whether to start charging. More specifically, the charging start conditions may include that the output voltage from the battery 26 is lower than a threshold voltage for determining whether to start charging.

When rapid charging completion conditions are satisfied in rapid charging, the charger control circuit 110 switches to slow charging.

The rapid charging completion conditions include that the cell voltage of the battery 26 falls within a predetermined range including the threshold voltage or that the cell temperature falls outside the range of allowable temperature. The rapid charging completion conditions are stored in the memory of the charger control circuit 110 as the control data.

The rapid charging completion conditions may further include that the output voltage from the battery 26 is higher than a threshold voltage for determining whether to complete rapid charging.

When charging completion conditions are satisfied in slow charging, the charger control circuit 110 stops charging.

The charging completion conditions include that the battery 26 is in the fully charged state. Determination as to whether the charging completion conditions are satisfied is determined based on at least one of the elapsed time from the start of charging, the charging capacity of the battery 26, and the cell voltage of the battery 26, for example. The charging completion conditions are stored in the memory of the charger control circuit 110 as the control data.

As described above, charging control on the battery 26 is continuously performed by the charger control circuit 110 until the battery 26 is fully charged. After starting charging the battery 26, when the battery 26 is fully charged, the charger control circuit 110 stops supply of the charging current to finish charging the battery 26.

To perform charging/discharging control, the charger control circuit 110 monitors the output voltage from the battery 26 and various parameters, such as cell voltage, cell temperature, and whether disconnection occurs in the battery 26. When the parameters are in an abnormal state, the charger control circuit 110 stops charging or discharging the battery 26. The charger control circuit 110 generates and outputs a direct current by adjusting the current value and the voltage value to an appropriate charging current and an appropriate charging voltage within a range where the values do not exceed the respective upper limits based on the cell temperature, the charging current characteristics, and the charging voltage characteristics.

Figure 7:
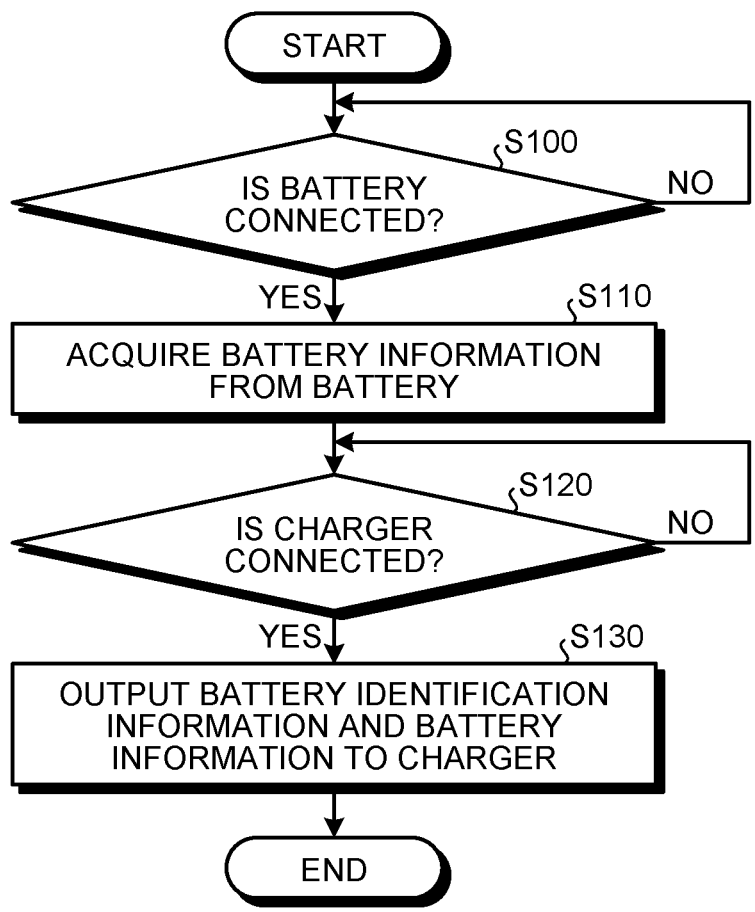
FIG. 7 is a flowchart of an example of a method for charging the rechargeable cleaner according to the first embodiment and illustrates processing performed by a body control circuit.
Figure 8:
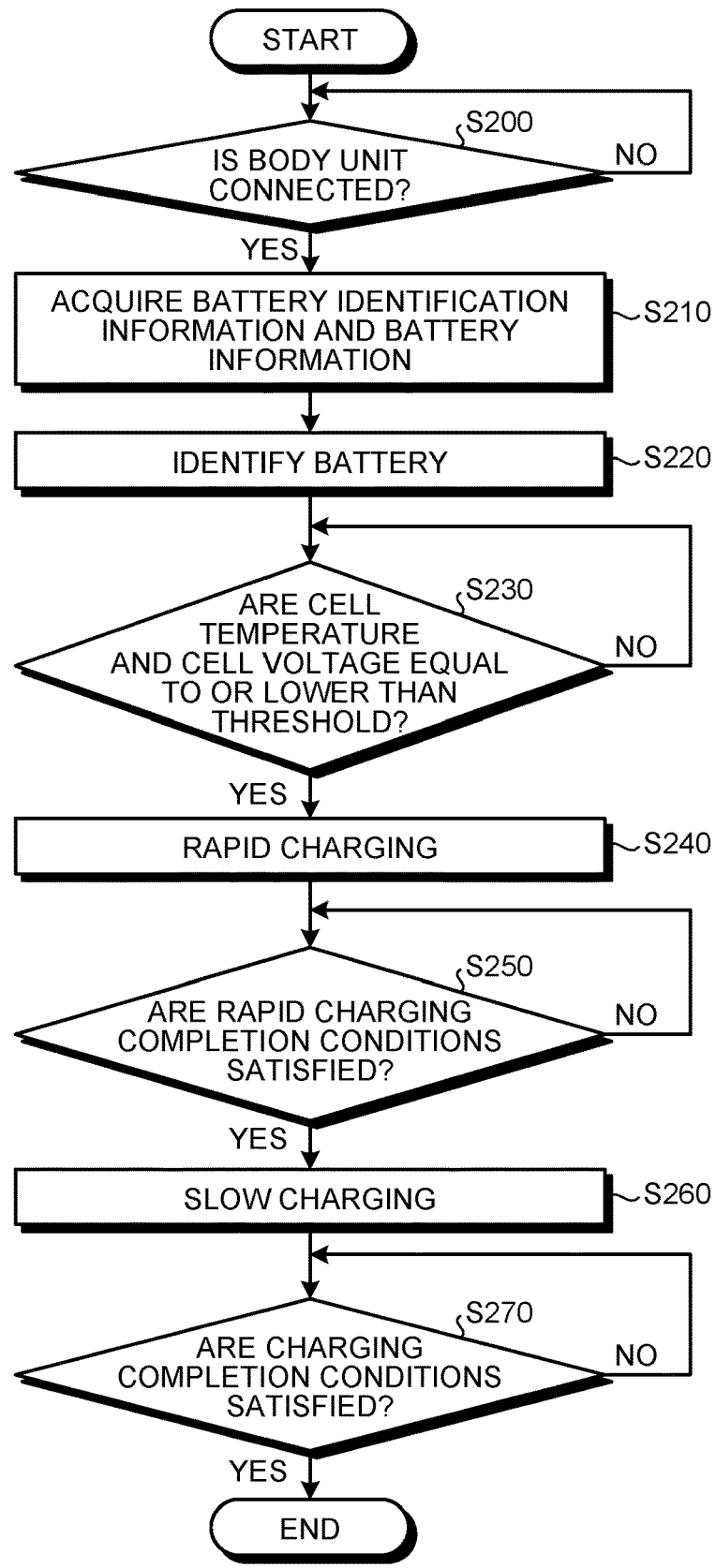
FIG. 8 is a flowchart of an example of the method for charging the rechargeable cleaner according to the first embodiment and illustrates processing performed by a charger control circuit.

The following describes the method for charging the rechargeable cleaner 10 with reference to FIGS. 7 and 8. FIG. 7 is a flowchart of an example of the method for charging the rechargeable cleaner according to the first embodiment and illustrates processing performed by the body control circuit. FIG. 8 is a flowchart of an example of the method for charging the rechargeable cleaner according to the first embodiment and illustrates processing performed by the charger control circuit.

The operations performed by the battery 26 of the rechargeable cleaner 10 in charging the battery 26 are described. When the battery 26 is connected to the body unit 20, the battery 26 outputs the battery identification information and the battery information to the body control circuit 70. After charging is started, the battery 26 outputs the battery information to the body control circuit 70 at a predetermined timing.

The following describes the processing performed by the body control circuit 70 of the control circuit board 60 disposed in the body unit 20 to charge the battery 26 of the rechargeable cleaner 10 with reference to FIG. 7.

The body control circuit 70 determines whether the battery 26 is connected to the body unit 20 (Step S100). If the body control circuit 70 determines that the battery 26 is connected (Yes at Step S100), the body control circuit 70 proceeds to Step S110. If the body control circuit 70 does not determine that the battery 26 is connected (No at Step S100), the body control circuit 70 performs the processing at Step S100 again.

The body control circuit 70 acquires the battery identification information and the battery information on the battery 26 from the battery 26 via the signal path P12 (Step S110).

The body control circuit 70 determines whether the charger 100 is connected to the body unit 20 (Step S120). If the body control circuit 70 determines that the charger 100 is connected (Yes at Step S120), the body control circuit 70 proceeds to Step S130. If the DC plug 104 of the charger 100 is connected to the DC jack 28 of the body unit 20, the body control circuit 70 determines that the charger 100 is connected. If the body control circuit 70 does not determine that the charger 100 is connected (No at Step S120), the body control circuit 70 performs the processing at Step S120 again.

The body control circuit 70 outputs the battery identification information and the battery information on the battery 26 to the charger 100 via the signal path P16 (Step S130).

After charging is started, the battery 26 outputs the battery information to the body control circuit 70 at a predetermined timing. If the body control circuit 70 acquires the battery information, the body control circuit 70 outputs the acquired battery information to the charger 100.

The following describes the processing performed by the charger control circuit 110 of the charger 100 to charge the battery 26 of the rechargeable cleaner 10 with reference to FIG. 8.

The charger control circuit 110 determines whether the body unit 20 is connected to the charger 100 (Step S200). If the charger control circuit 110 determines that the body unit 20 is connected to the charger 100 (Yes at Step S200), the charger control circuit 110 proceeds to Step S210. The charger control circuit 110 determines that the body unit 20 is connected to the charger 100 when the DC plug 104 of the charger 100 is connected to the DC jack 28 of the body unit 20. If the charger control circuit 110 does not determine that the body unit 20 is connected to the charger 100 (No at Step S200), the charger control circuit 110 performs the processing at Step S200 again.

The charger control circuit 110 acquires the battery identification information and the battery information on the battery 26 via the signal path P16 (Step S210).

The charger control circuit 110 identifies the battery 26 based on the battery identification information on the battery 26 (Step S220).

The charger control circuit 110 determines whether the cell temperature and the cell voltage are equal to or lower than a threshold for starting charging as the charging start conditions based on the battery information (Step S230). If the charger control circuit 110 determines that the cell temperature is equal to or lower than the threshold for starting charging and that the cell voltage is equal to or lower than the threshold for starting charging (Yes at Step S230), the charger control circuit 110 proceeds to Step S240. If the charger control circuit 110 determines that the cell temperature is larger than the threshold for starting charging or that the cell voltage is larger than the threshold for starting charging (No at Step S230), the charger control circuit 110 performs the processing at Step S230 again.

At Step S230, the charger control circuit 110 may also determine whether the remaining charge of the battery 26 is smaller than a threshold for determining whether to start charging as the charging start conditions.

The charger control circuit 110 performs rapid charging (Step S240). More specifically, the charger control circuit 110 acquires the current value of the high-rate charging current for rapidly charging the battery 26 based on the battery information and the charging information. The charger control circuit 110 may acquire the current value of the high-rate charging current for rapid charging based on the charging current characteristics and the charging voltage characteristics corresponding to the cell temperature stored in advance. The charger control circuit 110 generates the high-rate charging current having the acquired current value. The charger control circuit 110 outputs the generated high-rate charging current to the body control circuit 70 via the charging path P17.

At Step S240, the charger control circuit 110 always monitors whether the cell temperature falls within the range of allowable temperature for charging based on the battery information during rapid charging.

The charger control circuit 110 determines whether the rapid charging completion conditions are satisfied based on the battery information (Step S250). The charger control circuit 110 may determine whether the cell voltage of the battery 26 is equal to or lower than a threshold as the rapid charging completion conditions. If the output voltage from the battery 26 starts to rise during constant current charging in rapid charging, in other words, if the output voltage from the battery 26 reaches the threshold voltage, the charger control circuit 110 switches to constant-voltage slow charging at a constant voltage. The charger control circuit 110 may also determine whether the cell temperature falls within the range of allowable temperature as the rapid charging completion conditions. If the cell temperature rises to a high temperature during constant current charging in rapid charging, the charger control circuit 110 reduces the charging current and switches to constant-voltage slow charging at a constant voltage. In this case, the constant voltage may linearly or stepwisely change so as to be lower as the cell temperature is higher. If the charger control circuit 110 determines that the rapid charging completion conditions are satisfied (Yes at Step S250), the charger control circuit 110 proceeds to Step S260. If the charger control circuit 110 does not determine that the rapid charging completion conditions are satisfied (No at Step S250), the charger control circuit 110 performs the processing at Step S250 again.

At Step S250, the charger control circuit 110 may also determine whether the output voltage from the battery 26 is higher than a threshold voltage for determining whether to complete rapid charging as the rapid charging completion conditions.

The charger control circuit 110 performs slow charging (Step S260). The charger control circuit 110 always monitors the cell temperature and the cell voltage in slow charging. The charger control circuit 110 may acquire the current value of the low-rate charging current based on the charging current characteristics and the charging voltage characteristics. If the cell temperature is equal to or higher than the upper limit threshold, the charger control circuit 110 reduces the current value of the charging current. If the cell temperature is lower than the lower limit threshold, the charger control circuit 110 stops slow charging. If the cell voltage is equal to or higher than the upper limit threshold, the charger control circuit 110 reduces the current value of the charging current. If the cell voltage is abnormally higher than the upper limit threshold, the charger control circuit 110 stops slow charging. The charger control circuit 110 generates the charging current at a lower rate than the high rate in rapid charging. The charger control circuit 110 outputs the generated low-rate charging current at a constant voltage to the body control circuit 70 via the charging path P17.

The charger control circuit 110 determines whether charging completion conditions are satisfied based on the battery information (Step S270). The charger control circuit 110 determines whether the charging completion conditions are satisfied based on information on the charging capacity of the battery 26. The charger control circuit 110 determines whether the charging completion conditions are satisfied based on at least one of the elapsed time from the start of charging, the charging capacity of the battery 26, and the cell voltage of the battery 26, for example. If the charger control circuit 110 determines that the charging completion conditions are satisfied (Yes at Step S270), the charger control circuit 110 ends the charging. If the charger control circuit 110 does not determine that the charging completion conditions are satisfied (No at Step S270), the charger control circuit 110 performs the processing at Step S270 again.

If the cell temperature falls significantly outside the range of allowable temperature or reaches a predetermined abnormal temperature at Step S240 or S270, the charger control circuit 110 stops charging, which is not illustrated in the flowchart.

As described above, if the user connects the DC plug 104 of the charger 100 connected to an AC power source to the DC jack 28 of the body unit 20, and the charging start conditions are satisfied, the charger 100 generates the high-rate charging current to rapidly charge the battery 26. Subsequently, if the rapid charging completion conditions are satisfied, the charger 100 switches to slow charging. In slow charging, the charger 100 generates the charging current at a lower rate than in the rapid charging to slowly charge the battery 26 until the battery 26 is fully charged. The battery 26 is fully charged in a short time.

As described above, the charger 100 according to the present embodiment generates a high-rate charging current in rapid charging and generates a lower-rate charging current in slow charging than in rapid charging. The present embodiment can rapidly charge the battery 26 with the high-rate charging current. If the rapidly charging completion conditions are satisfied, the present embodiment can fully charge the battery 26 by slow charging with the low-rate charging current. Consequently, the present embodiment can fully charge the battery 26 in a short time.

By setting the charging rate to 3 C or higher, the present embodiment can fully charge the battery 26 in 20 minutes or shorter. The present embodiment can charge the battery 26 during a typical break time.

The control circuit board 60 according to the present embodiment is not provided with any electronic parts that control the charging current and the charging voltage. The present embodiment can make the body unit 20 small in size and light in weight. Consequently, the present embodiment can reduce load on the user in use of the rechargeable cleaner 10.

The present embodiment rapidly charges the battery 26 with the charging current at a high rate of 3 C or higher and lower than 10 C. The present embodiment can use a thinner electric wire for the charging/discharging path than in a case where the charging current at a rate of 10 C or higher is used. Consequently, the present embodiment enables reduction in size and weight.

By setting the charging rate to lower than 10 C, the present embodiment can reduce power consumption to 0.1 W or larger and 0.4 W or smaller when the capacity of the battery 26 is 1 Ah or larger and 2 Ah or smaller, and on-resistance of the FET, which is not illustrated, disposed in the circuit is 1 mΩ. As described above, the present embodiment reduces power consumption and does not require any radiator plate. Consequently, the present embodiment enables reduction in size and light in weight.

The control circuit board 60 according to the present embodiment is not provided with any electronic parts that control the charging current and the charging voltage. The present embodiment can reduce the number of electronic parts that generate heat in the body unit 20. The present embodiment can prolong the lives of various members disposed in the body unit 20.

Compared with a case where the charging current at a rate of 10 C or higher is used, the present embodiment can prevent heat generation. Consequently, the present embodiment has a smaller effect on the lives of various members.

The memory of the charger control circuit 110 according to the present embodiment stores therein the charging information for each battery type. The present embodiment acquires the current value of the high-rate charging current for rapid charging based on the charging information and the battery identification information. Consequently, the present embodiment can appropriately rapidly charge the battery 26 with one charger 100 independently of the type of the battery 26.

Second Embodiment

Figure 9:
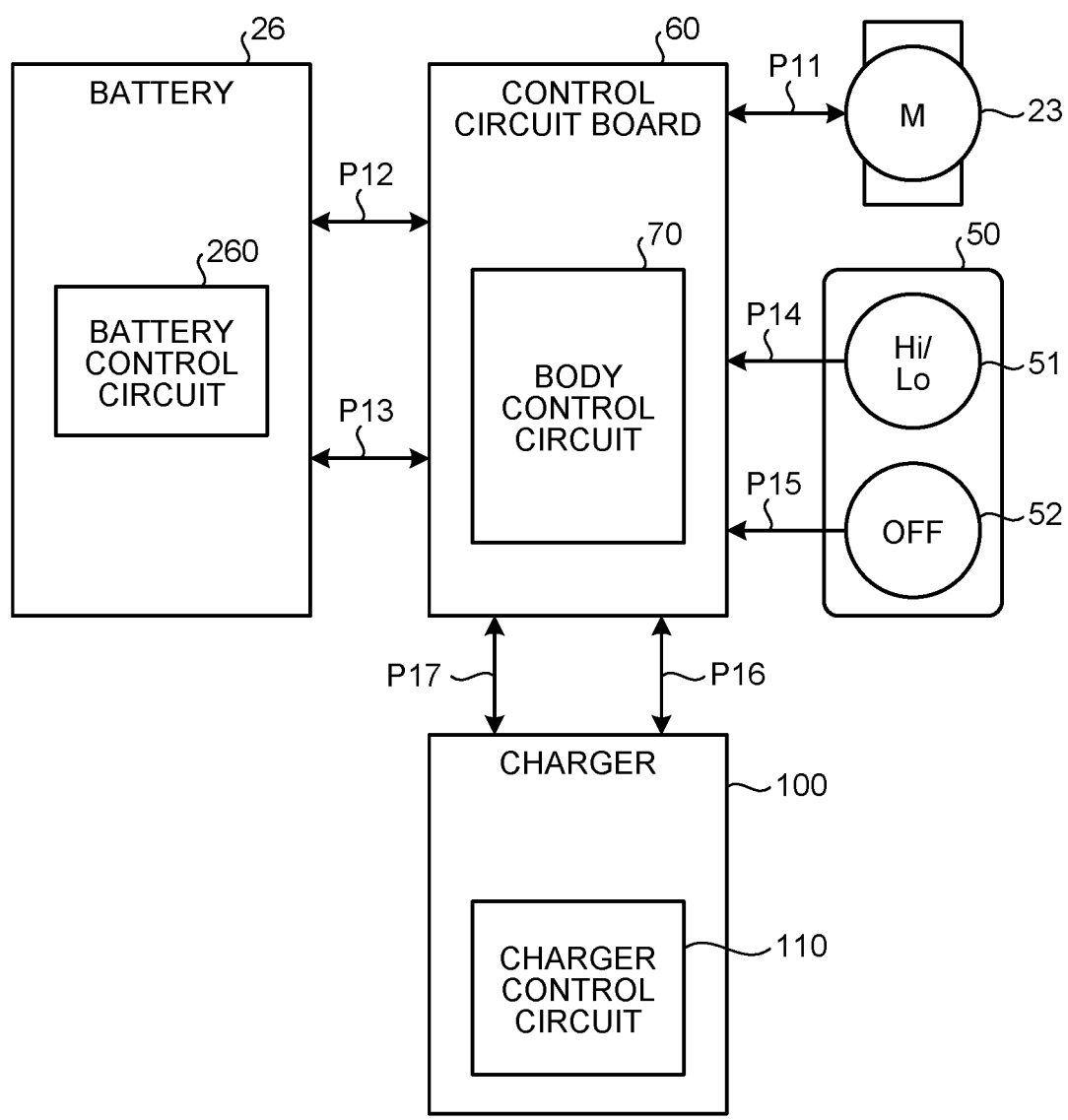
FIG. 9 is a block diagram of an example of the control circuit of the rechargeable cleaner according to a second embodiment.
Figure 10:
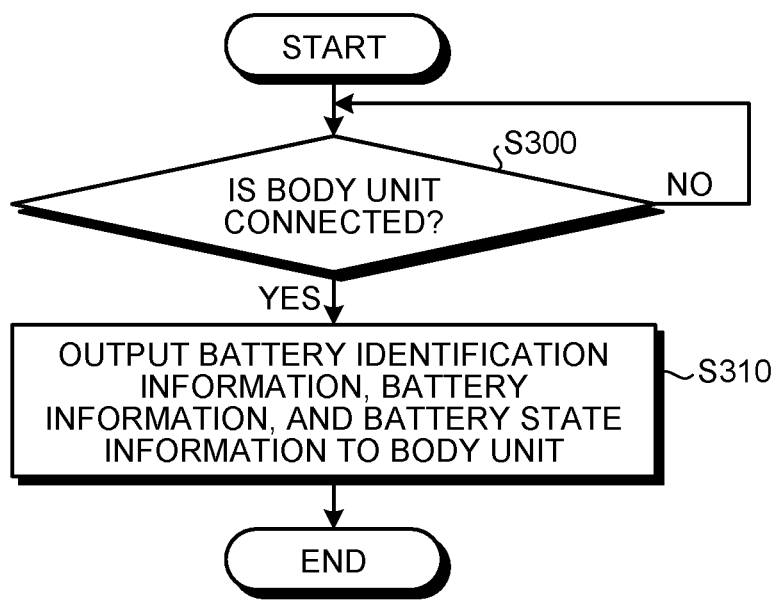
FIG. 10 is a flowchart of an example of the method for charging the rechargeable cleaner according to the second embodiment and illustrates processing performed by a battery control circuit.
Figure 11:
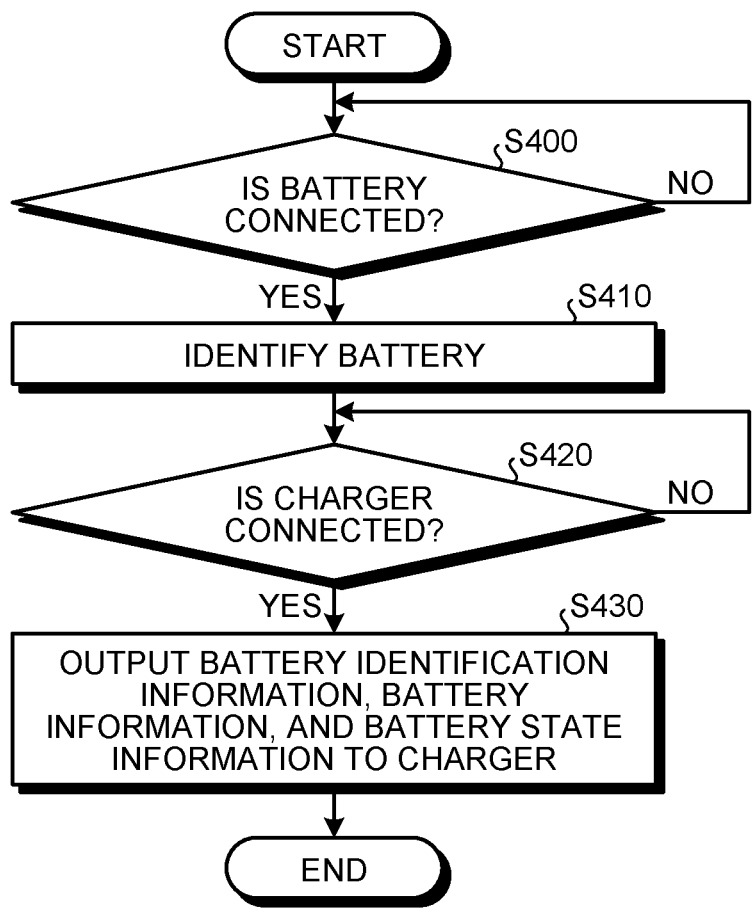
FIG. 11 is a flowchart of an example of the method for charging the rechargeable cleaner according to the second embodiment and illustrates processing performed by the body control circuit.

The following describes the rechargeable cleaner 10 according to the present embodiment with reference to FIGS. 9 to 12. FIG. 9 is a block diagram of an example of the control circuit of the rechargeable cleaner according to a second embodiment. FIG. 10 is a flowchart of an example of the method for charging the rechargeable cleaner according to the second embodiment and illustrates processing performed by a battery control circuit. FIG. 11 is a flowchart of an example of the method for charging the rechargeable cleaner according to the second embodiment and illustrates processing performed by the body control circuit. FIG. 12 is a flowchart of an example of the method for charging the rechargeable cleaner according to the second embodiment and illustrates processing performed by the charger control circuit. The basic configuration of the rechargeable cleaner 10 is the same as that of the rechargeable cleaner 10 according to the first embodiment. In the following description, components similar to those of the rechargeable cleaner 10 are denoted by like or corresponding reference numerals, and detailed explanation thereof is omitted. The present embodiment is different from the first embodiment in the charging control method performed by the charger control circuit 110.

The battery 26 includes a battery control circuit 260. The battery control circuit 260 can acquire, in addition to the battery identification information and the battery information on the battery 26, battery state information indicating use history, that is, a deterioration state of the battery 26.

The battery state information indicates the state of the battery 26 and the cells in charging or discharging the battery. The battery state information indicates the history of charging and discharging the battery 26, such as the number of times of charging and discharging, charging and discharging time, overcharge and over-discharge states, and whether the state is an unbalanced state. The battery state information indicates the deterioration state of the battery 26.

The battery control circuit 260 outputs the battery state information as digital signals to the body control circuit 70 via the signal path P12. When the battery 26 is connected to the body unit 20, the battery control circuit 260 outputs the battery state information to the body control circuit 70. After charging is started, the battery control circuit 260 outputs the battery state information to the body control circuit 70 at a predetermined timing.

If the body control circuit 70 detects that the battery 26 is connected to the body unit 20, the body control circuit 70 acquires the battery state information besides the battery identification information and the battery information from the battery 26 via the signal path P12. After charging is started, the body control circuit 70 acquires the battery information and the battery state information from the battery 26 via the signal path P12 at a predetermined timing.

If the body control circuit 70 detects that the charger 100 is connected to the body unit 20, the body control circuit 70 outputs the battery state information besides the battery identification information and the battery information as digital signals to the charger 100 via the signal path P16. After charging is started, the body control circuit 70 outputs the battery information and the battery state information as digital signals to the charger 100 via the signal path P16 at a predetermined timing.

The charger control circuit 110 acquires the battery state information besides the battery identification information and the battery information via the body control circuit 70. More specifically, when charging is started, the charger control circuit 110 acquires the battery state information besides the battery identification information and the battery information on the battery 26 output from the body control circuit 70 via the signal path P16. After charging is started, the charger control circuit 110 acquires the battery information and the battery state information output from the body control circuit 70 via the signal path P16 at a predetermined timing.

In charging the battery 26, the charger control circuit 110 calculates and generates at least one of the current value of the charging current and the voltage value of the charging voltage based on the battery identification information, the battery information, and the battery state information. The charging current value is calculated so as not to exceed the current value of the charging current for rapid charging. If the battery 26 deteriorates, the charging current and the charging voltage are preferably reduced compared with a new battery 26 with little deterioration, for example, to reduce the effect on the cycle life of the battery 26. The current value of the charging current is calculated such that the current value of the charging current is made smaller than when the battery 26 is new as deterioration proceeds, for example, depending on the use history of the battery 26. The voltage value of the charging voltage is calculated such that the voltage value of the charging voltage is made smaller than when the battery 26 is new as deterioration proceeds, for example, depending on the use history of the battery 26. As described above, the battery 26 is charged with an optimum current value of the charging current and an optimum voltage value of the charging voltage at a charging rate of lower than 10 C, taking the cycle life of the battery 26 into consideration.

If the battery 26 is rapidly charged with a constant current of 10 A when it is new, for example, the battery 26 is rapidly charged with a constant current having a current value reduced to smaller than 10 A depending on the deterioration state. In slow charging, the battery 26 is charged at a constant voltage having a voltage value smaller than when it is new.

At a time of starting charging, the charger control circuit 110 rapidly charges the battery 26 with the high-rate charging current depending on the deterioration state of the battery 26. Subsequently, if the rapid charging completion conditions are satisfied, the charger control circuit 110 performs control to slowly charge the battery 26.

The following describes the method for charging the rechargeable cleaner 10 with reference to FIGS. 10 to 12.

The following describes the processing performed by the battery control circuit 260 disposed in the battery 26 to charge the battery 26 of the rechargeable cleaner 10 with reference to FIG. 10.

The battery control circuit 260 determines whether the battery 26 is connected to the body unit 20 (Step S300). If the battery control circuit 260 determines that the battery 26 is connected (Yes at Step S300), the battery control circuit 260 proceeds to Step S310. If the battery control circuit 260 does not determine that the battery 26 is connected (No at Step S300), the battery control circuit 260 performs the processing at Step S300 again.

The battery control circuit 260 outputs the battery identification information, the battery information, and the battery state information on the battery 26 to the body unit 20 via the signal path P12 (Step S310).

After charging is started, the battery 26 outputs the battery information and the battery state information to the body control circuit 70 at a predetermined timing.

The following describes the processing performed by the body control circuit 70 of the body unit 20 to charge the battery 26 of the rechargeable cleaner 10 with reference to FIG. 11. The processing at Steps S400 and S420 is the same as the processing at Steps S100 and S120 in the flowchart illustrated in FIG. 7.

The body control circuit 70 acquires the battery identification information, the battery information, and the battery state information on the battery 26 from the battery 26 via the signal path P12 (Step S410).

The body control circuit 70 outputs the battery identification information, the battery information, and the battery state information on the battery 26 to the charger 100 via the signal path P16 (Step S430).

After charging is started, the body control circuit 70 outputs the battery information and the battery state information acquired by the body control circuit 70 to the charger 100 at a predetermined timing.

The following describes the processing performed by the charger control circuit 110 of the charger 100 to charge the battery 26 of the rechargeable cleaner 10 with reference to FIG. 12. The processing at Steps S500, S520, S530, and S550 is the same as the processing at Steps S200, S220, S230, and S270 in the flowchart illustrated in FIG. 8.

The charger control circuit 110 acquires the battery identification information, the battery information, and the battery state information on the battery 26 via the signal path P16 (Step S510).

The charger control circuit 110 performs optimum charging (Step S540). More specifically, at a time of starting charging, the charger control circuit 110 acquires the high-rate charging current for optimally charging the battery 26 depending on the deterioration state of the battery 26 based on the battery information, the battery state information, and the charging information. The charger control circuit 110 generates the high-rate charging current having the acquired current value. The charger control circuit 110 outputs the generated high-rate charging current to the body control circuit 70 via the charging path P17. If the rapid charging completion conditions are satisfied, the charger control circuit 110 acquires a constant voltage for the low-rate charging current for optimally charging the battery 26 depending on the deterioration state of the battery 26 based on the battery information, the battery state information, and the charging information. The charger control circuit 110 generates and outputs a direct current by adjusting the current value and the voltage value to an optimum charging current and an optimum charging voltage within a range where the values do not exceed the respective upper limits based on the cell temperature, the charging current characteristics, and the charging voltage characteristics.

As described above, the charger 100 according to the present embodiment generates and outputs an optimum charging current or an optimum charging voltage with the high-rate charging current as the upper limit based on the battery state information, that is, depending on the deterioration state of the battery 26. The present embodiment can appropriately rapidly charge the battery 26 with the high-rate charging current. Consequently, the present embodiment can fully charge the battery 26 in a short time while reducing the effect on the cycle life of the battery 26.

The electric wire 103 of the charger 100 may be detachable from the adapter case 102. With this configuration, the electric wire 103 is easy to replace when it is broken. Furthermore, the electric wire 103 can be replaced by another electric wire 103 having an appropriate length depending on the place of use of the charger 100, for example.

The body unit 20 may be provided with a USB terminal through which electric power can be supplied from the battery 26 to external electronic devices. With this configuration, the rechargeable cleaner 10 can supply electric power to a mobile electronic device of the user when supply from the AC power source stops in disasters, for example.

The battery 26 may be capable of detecting the voltage of the battery 26. The voltage of the battery 26 can be detected by a monitoring circuit, which is not illustrated, disposed in the battery 26. If the monitoring circuit detects that the voltage of the battery 26 exceeds a threshold, the monitoring circuit can output detection information as digital signals to the body control circuit 70. The body control circuit 70 can acquire the voltage detected by the battery 26. The body control circuit 70 compares the voltage detected by the battery 26 with the voltage of the battery 26 detected by the body control circuit 70, thereby enabling calculating a drop in voltage in the charging/discharging path P13. As a result, erroneous recognition of the voltage of the battery 26 is prevented. Consequently, the charging can be more appropriately controlled.

In the embodiments described above, the battery 26 and the body control circuit 70 are electrically connected via the signal path P12 serving as a signal line and the charging/discharging path P13 serving as an electric wire. Alternatively, the electric wire may function not only as the charging/discharging path P13 but also as the signal path P12. For example, the electric wire may function as the signal path P12 when charging or discharging is stopped by a switch. Information may be transmitted and received using an inductance component in the cell, for example.

The configuration of the rechargeable cleaner 10 described above is given by way of example only. The combination and the shapes of the body unit 20, the pipe unit 30, and the nozzle unit 40 are not limited to those described above. The battery 26 may be detachably or non-detachably incorporated inside or outside the case 21.

REFERENCE SIGNS LIST

- 10 rechargeable cleaner
- 20 body unit (body)
- 21 case
- 22 suction port
- 23 motor
- 24 suction fan
- 25 dust collection filter
- 26 battery
- 27 handle
- 28 DC jack
- 30 pipe unit
- 31 pipe member
- 40 nozzle unit
- 41 coupler
- 42 head
- 50 operating switch
- 51 drive switch
- 52 stop switch
- 54 LED
- 60 control circuit board
- 70 body control circuit (body controller)
- 100 charger
- 110 charger control circuit (charger controller)

The invention claimed is:

1. A rechargeable cleaner comprising:
   a body configured to generate suction power capable of sucking dust together with air using a motor;
   a rechargeable battery configured to supply electric power to the motor; and
   a charger configured to charge the battery at a charging rate of 3 C or higher and lower than 10 C;
   a body controller disposed in the body and connected to the motor via an electric wire; and
   a charger controller disposed in the charger, wherein
   the body controller is configured to
      acquire, from the battery, cell voltage information indicating a cell voltage, cell temperature information indicating a cell temperature, and battery identification information for identifying the battery via a first signal path that electrically connects the body controller to the battery, and
      output, to the charger controller, the cell voltage information, the cell temperature information, and the battery identification information thus acquired via a second signal path that electrically connects the body controller to the charger, and
   the charger controller is configured to control at least one of a charging current and a charging voltage based on the cell voltage information, the cell temperature information, and the battery identification information.

2. The rechargeable cleaner according to claim 1, wherein the body controller is configured to output at least the cell voltage information and the cell temperature information to the charger controller at a predetermined timing in charging the battery.

3. The rechargeable cleaner according to claim 1, wherein
   the body controller is configured to acquire battery identification information for identifying the battery and battery state information indicating at least one of use history and history of charging and discharging of the battery and output the battery identification information and the battery state information to the charger controller, and
   the charger controller is configured to control at least one of a charging current and a charging voltage based on the battery identification information and the battery state information.

4. The rechargeable cleaner according to claim 1, wherein the body controller is configured to output at least the battery state information, the cell voltage information, and the cell temperature information to the charger controller at a predetermined timing in charging the battery.

5. The rechargeable cleaner according to claim 1, wherein the charger controller is configured to switch between rapid charging and slow charging with a charging current at a lower rate than in the rapid charging.

6. The rechargeable cleaner according to claim 5, wherein the charger controller is configured to start the rapid charging when both of:
   the cell temperature of the battery is equal to or lower than a threshold temperature for starting charging, and
   the cell voltage is equal to or lower than a threshold voltage for starting charging.

7. The rechargeable cleaner according to claim 6, wherein the charger controller is configured to switch to the slow charging when an output voltage from the battery reaches the threshold voltage.

8. The rechargeable cleaner according to claim 6, wherein the charger controller is configured to switch to the slow charging when the cell temperature falls outside a predetermined range.

9. The rechargeable cleaner according to claim 3, wherein the charger controller is configured to switch between rapid charging and slow charging with a charging current at a lower rate than in the rapid charging.

10. The rechargeable cleaner according to claim 9, wherein the charger controller starts the rapid charging when both of:
    the cell temperature of the battery is equal to or lower than a threshold temperature for starting charging, and
    the cell voltage is equal to or lower than a threshold voltage for starting charging.

11. The rechargeable cleaner according to claim 10, wherein the charger controller switches to the slow charging when an output voltage from the battery reaches the threshold voltage.

12. The rechargeable cleaner according to claim 10, wherein the charger controller is configured to switch to the slow charging when the cell temperature falls outside a predetermined range.

* * * * *